United States Patent
Nakanishi et al.

(10) Patent No.: US 8,582,370 B2
(45) Date of Patent: Nov. 12, 2013

(54) STORAGE UNIT FOR OCCUPANT DETECTION SYSTEM

(75) Inventors: Ryota Nakanishi, Kariya (JP); Chiaki Sumi, Chita-gun (JP); Koji Ito, Yatomi (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 300 days.

(21) Appl. No.: 13/075,678

(22) Filed: Mar. 30, 2011

(65) Prior Publication Data

US 2012/0059618 A1    Mar. 8, 2012

(30) Foreign Application Priority Data

Sep. 2, 2010  (JP) ................. 2010-196791

(51) Int. Cl.
*G11C 16/04*    (2006.01)
(52) U.S. Cl.
USPC ............ 365/185.24; 365/185.03; 365/185.11; 365/185.33; 365/94; 365/103; 365/104; 365/230.03
(58) Field of Classification Search
USPC ............ 365/185.24, 185.03, 185.11, 185.33, 365/94, 103, 104, 230.03
See application file for complete search history.

(56) References Cited

U.S. PATENT DOCUMENTS

| 7,788,553 B2 * | 8/2010 | Chow et al. | 714/718 |
| 7,960,713 B2 * | 6/2011 | Hunt et al. | 257/4 |
| 2009/0069985 A1 * | 3/2009 | Sakai et al. | 701/49 |

FOREIGN PATENT DOCUMENTS

JP    9-207638 A    8/1997

* cited by examiner

*Primary Examiner* — Fernando Hidalgo
(74) *Attorney, Agent, or Firm* — Buchanan Ingersoll & Rooney PC (57) ABSTRACT

A storage unit for an occupant detection system detecting an occupant based on a magnitude correlation between a detection load value obtained by a load sensor and a threshold value, the storage unit includes a first ROM storing either one of the threshold value and a threshold value specific information for identifying the threshold value, the first ROM being rewritable and a second ROM storing information except for either one of the threshold value and the threshold value specific information, a rewriting of the second ROM being more difficult than a rewriting of the first ROM.

17 Claims, 6 Drawing Sheets

| External ROM | | | External ROM value |
|---|---|---|---|
| Threshold value T1 from | "No occupant" to | "Child" | 200 |
| Threshold value T2 from | "Child" to | "Adult" | 250 |
| Threshold value T3 from | "No occupant" to | "Adult" | 400 |
| Threshold value T4 from | "Child" to | "No occupant" | 50 |
| Threshold value T5 from | "Adult" to | "No occupant" | 50 |

| External ROM | External ROM value |
|---|---|
| Threshold value T1 from "No occupant" to "Child" | 200 |
| Threshold value T2 from "Child" to "Adult" | 250 |
| Threshold value T3 from "No occupant" to "Adult" | 400 |
| Threshold value T4 from "Child" to "No occupant" | 50 |
| Threshold value T5 from "Adult" to "No occupant" | 50 |

F I G. 3

| External ROM | External ROM value | | | CPU determination (Normal value) |
|---|---|---|---|---|
| | Area 1 | Area 2 | Area 3 | |
| Threshold value T1 from "No occupant" to "Child" | 200 | 200 | 200 | 200 |
| Threshold value T1 from "No occupant" to "Child" | 200 | 100 | 100 | 100 |
| Threshold value T1 from "No occupant" to "Child" | 200 | 200 | 100 | 200 |
| Threshold value T1 from "No occupant" to "Child" | 200 | 100 | 150 | NG: Read out the value from the internal program |

FIG. 5

| Pattern data | External ROM | External ROM value |
|---|---|---|
| 1 | Threshold value T1 from "No occupant" to "Child" | 200 |
| | Threshold value T2 from "Child" to "Adult" | 250 |
| | Threshold value T3 from "No occupant" to "Adult" | 400 |
| | Threshold value T4 from "Child" to "No occupant" | 50 |
| | Threshold value T5 from "Adult" to "No occupant" | 50 |
| 2 | Threshold value T1 from "No occupant" to "Child" | 210 |
| | Threshold value T2 from "Child" to "Adult" | 260 |
| | Threshold value T3 from "No occupant" to "Adult" | 410 |
| | Threshold value T4 from "Child" to "No occupant" | 51 |
| | Threshold value T5 from "Adult" to "No occupant" | 51 |
| 3 | Threshold value T1 from "No occupant" to "Child" | 240 |
| | Threshold value T2 from "Child" to "Adult" | 410 |
| | Threshold value T3 from "No occupant" to "Adult" | 53 |
| | Threshold value T4 from "Child" to "No occupant" | 220 |
| | Threshold value T5 from "Adult" to "No occupant" | 53 |
| 4 | Threshold value T1 from "No occupant" to "Child" | 190 |
| | Threshold value T2 from "Child" to "Adult" | 240 |
| | Threshold value T3 from "No occupant" to "Adult" | 390 |
| | Threshold value T4 from "Child" to "No occupant" | 48 |
| | Threshold value T5 from "Adult" to "No occupant" | 48 |

F I G. 6

| External ROM | External ROM value | | | CPU determination (Normal value) |
|---|---|---|---|---|
| | Area 1 | Area 2 | Area 3 | |
| Pattern area | 4 | 4 | 4 | 4 |
| | 4 | 4 | 2 | 4 |
| | 4 | 2 | 2 | 4 |
| | 1 | 2 | 4 | NG: Read out the value from the internal grogram |

STORAGE UNIT FOR OCCUPANT DETECTION SYSTEM

CROSS REFERENCE TO RELATED APPLICATIONS

This application is based on and claims priority under 35 U.S.C. §119 to Japanese Patent Application 2010-196791, filed on Sep. 2, 2010, the entire content of which is incorporated herein by reference.

TECHNICAL FIELD

This disclosure relates to a storage unit for an occupant detection system.

BACKGROUND DISCUSSION

In a case where an airbag is mounted at a vehicle so as to protect an occupant of a seat for the vehicle (i.e., the vehicle seat), for example, an occupant detection system is provided at the vehicle seat to thereby detect the occupant of the vehicle seat. Such occupant detection system is disclosed in JPH09-207638A. The occupant detection system disclosed in JPH09-207638A detects the occupant of the vehicle seat based on a magnitude correlation between a detection load value obtained by a load sensor provided at the vehicle seat and a predetermined threshold value stored beforehand at a read-only storage unit of a microcontroller unit (MCU) such as a UV-EPROM.

According to the occupant detection system, a threshold value serving as a constant may change in association with an implementation of a vehicle evaluation. In a case of the change of the threshold value, software is modified so as to change the constant of program stored in the read-only storage unit of the microcontroller unit. Such program change involves a drawing change of the microcontroller unit. That is, various types of programs, each of which is stored in the read-only storage unit of the microcontroller unit, are present while having different constants from one another. Accordingly, the number of types of the controller units for the occupant detection system increases in association with the number of different threshold values (i.e., the number of constants of the respective programs) stored in the read-only storage unit, which may lead to an increase of a management cost.

A need thus exists for a storage unit for an occupant detection system which is not susceptible to the drawback mentioned above.

SUMMARY

According to an aspect of this disclosure, a storage unit for an occupant detection system detecting an occupant based on a magnitude correlation between a detection load value obtained by a load sensor and a threshold value, the storage unit includes a first ROM storing either one of the threshold value and a threshold value specific information for identifying the threshold value, the first ROM being rewritable and a second ROM storing information except for either one of the threshold value and the threshold value specific information, a rewriting of the second ROM being more difficult than a rewriting of the first ROM.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
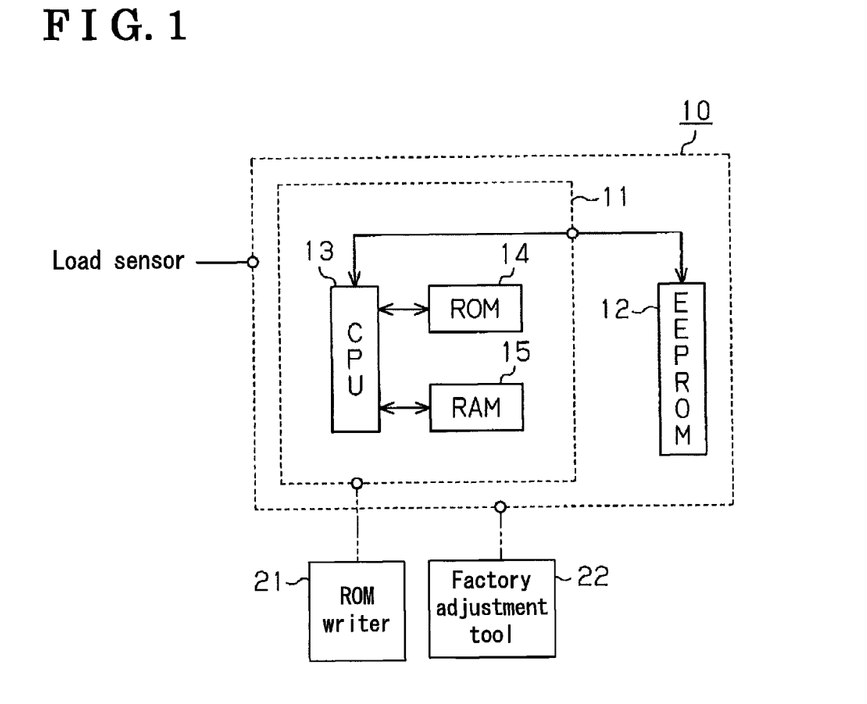
FIG. 1 is a block diagram illustrating a controller of an occupant detection system according to a first embodiment disclosed here.

A first embodiment disclosed here will be explained with reference to the attached drawings. As illustrated in FIG. 1, a controller 10 serving as a storage unit for an occupant detection system according to the first embodiment is electrically connected to a load sensor to thereby obtain a detection load value via a load signal output from the load sensor. The controller 10 then detects an occupant seated on a seat where the occupant detection system is applied on a basis of a magnitude correlation between the obtained detection load value and a threshold value T.

The controller 10 includes a microcontroller 11 and a flash-type EEPROM (electrically erasable and programmable ROM) 12 serving as a first ROM and an external ROM. The microcontroller 11 includes a CPU 13 performing various calculations and controls, a ROM 14 serving as a second ROM and an internal ROM, and a RAM 15.

The ROM 14 is constituted by a UV-EPROM, for example, so as to store program and data (but excluding the threshold value T) related to an occupant detection. Specifically, the ROM 14 stores the program and data including a default value (i.e., a fixed value) that may become the threshold value T. The ROM 14 only stores fixed data that are not rewritable or changeable depending on a vehicle type, and the like. On the other hand, the EEPROM 12 stores the threshold value T that is rewritable depending on the vehicle type, and the like.

The CPU 13 reads out the program and data (including the default value for the threshold value T) related to the occupant detection from the ROM 14 and also reads out the threshold value T from the EEPROM 12 in an initial operation. The CPU 13 then writes the program and data from the ROM 14 and the threshold value T from the EEPROM 12 in the RAM 15 serving as a work space. The CPU 13 basically performs the occupant detection based on the threshold value T read out from the EEPROM 12. In addition, in a case where the threshold value T read out from the EEPROM 12 is determined to be an error value, the CPU 13 performs the occupant detection based on the default value for the threshold value T read out from the ROM 14.

Figure 2:
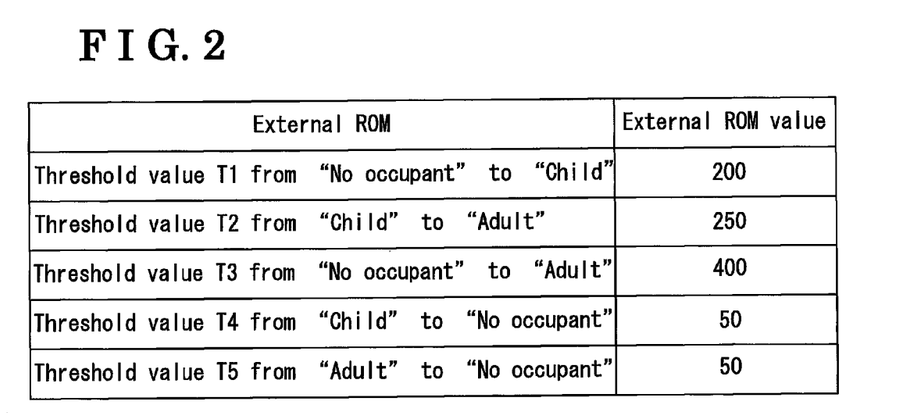
FIG. 2 is a diagram explaining a storage of a threshold value in an EEPROM according to the first embodiment.

Storage of the threshold value T in the EEPROM 12 will be explained with reference to FIGS. 2 and 3. As illustrated in FIG. 2, the EEPROM 12 according to the first embodiment stores multiple types of the threshold values (multiple threshold values) such as threshold values T1, T2, T3, T4, and T5

(which will be hereinafter collectively referred to as the threshold value T as necessary) for the occupant detection. Specifically, the EEPROM 12 stores the threshold value T1 (for example, a value 200) for changing or switching the detection of the occupant from "No occupant" to "Child (Infant)", the threshold value T2 (for example, a value 250) for switching the occupant detection from "Child" to "Adult", the threshold value T3 (for example, a value 400) for switching the occupant detection from "No occupant" to "Adult", the threshold value T4 (for example, a value 50) for switching the occupant detection from "Child" to "No occupant", and the threshold value T5 (for example, the value 50) for switching the occupant detection from "Adult" to "No occupant".

The EEPROM 12 includes three storage areas (which will be hereinafter referred to as areas 1, 2, and 3) at each of which the threshold value T (the threshold values T1, T2, T3, T4, and T5) is stored. The CPU 13 reads out the threshold value T in the area 1, the threshold value T in the area 2, and the threshold value T in the area 3, i.e., all of the areas 1 to 3 of the EEPROM 12. Then, the CPU 13 determines a normal value for the threshold value T by majority decision as illustrated in FIG. 3 (which will be explained later). Such determination is conducted so as to restrain an occurrence of malfunction in the occupant detection even in a case where any of the threshold value T stored in the EEPROM 12 (specifically, in the areas 1 to 3) shows an error.

Figure 3:
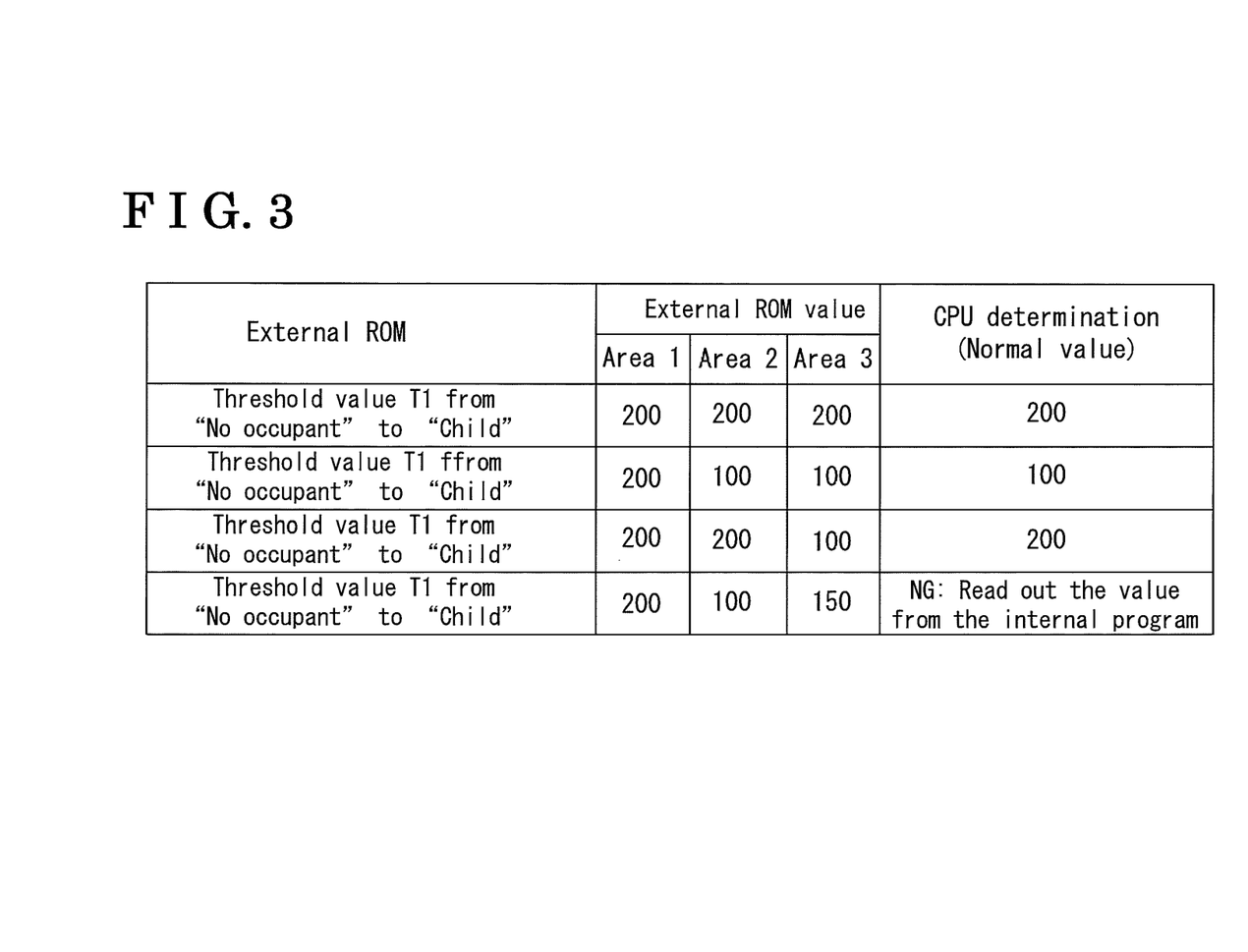
FIG. 3 is another diagram explaining the storage of the threshold value in the EEPROM according to the first embodiment.

For example, FIG. 3 illustrates an example of the threshold value T1. As illustrated in FIG. 3, in a case where the threshold values T1 in all of the areas 1 to 3 are equal to the value 200, the normal value for the threshold value T1 is defined to be the value 200 by majority decision. In a case where the threshold value T1 in the area 1 is equal to the value 200 while the threshold values T1 in the areas 2 and 3 are equal to a value 100, the normal value for the threshold value T1 is defined to be the value 100 by majority decision. In a case where the threshold values T1 in the areas 1 and 2 are equal to the value 200 while the threshold value T1 in the area 3 is equal to the value 100, the normal value for the threshold value T1 is defined to be the value 200 by majority decision. On the other hand, in a case where the threshold values T1 in the areas 1 to 3 are different from one another, i.e., the threshold values T1 in the areas 1 to 3 are equal to the values 200, 100, and 150, respectively, the majority decision is impossible to determine or obtain the normal value for the threshold value T1. In such case, the CPU 13 uses the default value for the threshold value T1 stored beforehand in the ROM 14 (i.e., an internal program).

Writing of data and the like to the ROM 14 and the EEPROM 12 will be explained below. The writing of data and the like to the ROM 14 is achieved by a ROM writer 21 that is exclusively provided for the writing of data and the like and that is electrically connected to the microcontroller 11. The writing of data is conducted before a factory adjustment (for example, before each of the controllers 10 is delivered to a factory). Thus, data and the like written in the ROM 14 of each of the microcontrollers 11 is identical before the factory adjustment. The controllers 10, in each of which the threshold value T is not written yet, are easily handled at the factory as they are similar types.

The writing of the threshold value T to the EEPROM 12 is achieved by a factory adjustment tool 22 that is electrically connected to the controller 10 at a time of the factory adjustment. The factory adjustment tool 22, which is mainly constituted by a personal computer, sends a control command to the CPU 13 of the microcontroller 11 in accordance with an operation of writing software that is installed beforehand in the factory adjustment tool 22 to thereby write the threshold value T in the EEPROM 12 via the CPU 13. As a result, the threshold value T that is appropriate to and suitable for a vehicle evaluation is stored in the EEPROM 12.

Figure 4A:
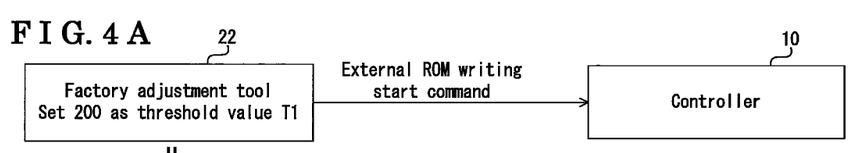
FIGS. 4A, 4B, 4C, and 4D are diagrams each illustrating an example of writing procedures of the threshold value to the EEPROM according to the first embodiment.
Figure 4B:
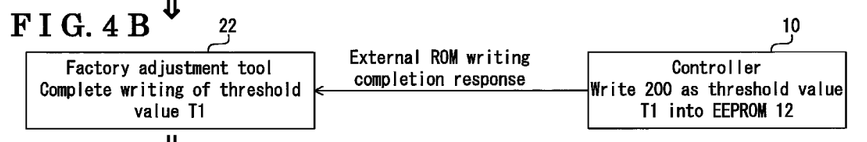

The writing procedures of the threshold value T, for example, the threshold value T1, to the EEPROM 12 will be explained with reference to FIGS. 4A, 4B, 4C, and 4D. As illustrated in FIGS. 4A, 4B, 4C, and 4D, in a case where the threshold value T1 is set to be the value 200 in the factory adjustment tool 22 for switching the occupant detection from "No occupant" to "Child", the factory adjustment tool 22 sends an external ROM writing start command to the controller 10 as illustrated in FIG. 4A. Then, the controller 10 writes the value 200 as the threshold value T1 into the EEPROM 12 (the external ROM) for switching the occupant detection from "No occupant" to "Child". At this time, as mentioned above, the value 200 is written to each of the areas 1 to 3 as the threshold value T1. After completion of such writing, the controller 10 sends an external ROM writing completion response to the factory adjustment tool 22 as illustrated in FIG. 4B. As a result, the writing of the threshold value T1 to the EEPROM 12 is completed in the factory adjustment tool 22.

Figure 4C:
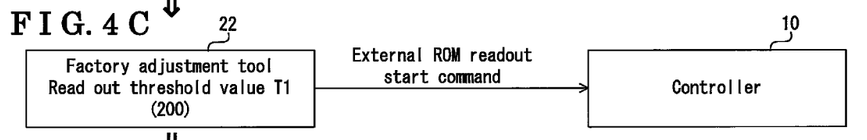
Figure 4D:
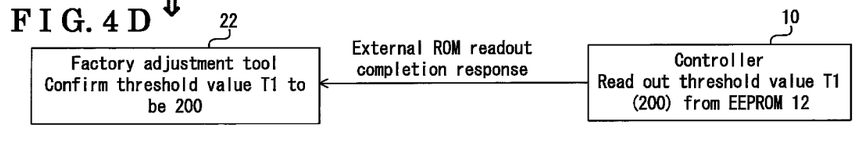

Next, the factory adjustment tool 22 sends an external ROM readout start command to the controller 10 so as to confirm whether the threshold value T1 is correctly written in the EEPROM 12 (the external ROM) as illustrated in FIG. 4C. Then, the controller 10 reads out the threshold value T1 from the EEPROM 12. When the aforementioned readout is completed, the controller 10 sends an external ROM readout completion response to the factory adjustment tool 22 as illustrated in FIG. 4D. Accordingly, the threshold value T1 (the value 200) in the EEPROM 12 is confirmed by the factory adjustment tool 22.

In a case where it is confirmed that the threshold value T (the threshold value T1 to T5) is correctly written to each of the areas 1 to 3 of the EEPROM 12, the controller 10 is delivered as an adjustment completed item.

According to the aforementioned first embodiment, the threshold value T is rewritable to the EEPROM 12. Therefore, the writing of the threshold value T is performed in the factory adjustment. All the controllers 10 for the occupant detection system are the similar types (i.e., having a similar configuration) before the writing of the threshold value T, thereby reducing a management cost. In addition, the rewriting of information except for the threshold value T (for example, program) into the ROM 14 is difficult. Therefore, the ROM 14 is restrained from being rewritten by mistake at the factory.

In addition, according to the first embodiment, the multiple threshold values, i.e., the threshold values T1 to T5 are stored for switching the occupant detection (i.e., for determining the occupancy of the seat for the vehicle). Thus, the occupant detection system determines the occupancy of the seat (for example, "No passenger", "Child", and "Adult") based on the magnitude relationship between the detection load value and one of the multiple threshold values, i.e., the threshold values T1 to T5. That is, the occupant detection system determines the switching of the occupant detection (for example, from "No occupant" to "Child", from "Child" to "Adult", and the like) based on the magnitude relationship between the detection load value and one of the threshold values T1 to T5. Accordingly, the further secure occupant detection may be achieved.

Further, according to the first embodiment, the EEPROM 12 stores the threshold value T at the three storage areas, i.e., the areas 1 to 3 so as to determine or obtain the normal value for the threshold value T by majority decision. Thus, even when the threshold value T shows an error in one of the storage areas of the EEPROM 12, for example, the occupant detection system uses the threshold value T obtained by majority decision to thereby continuously perform the occupant detection.

Furthermore, according to the first embodiment, the program is not necessarily created or changed for the adjustment of the threshold value T, thereby avoiding man-hours for a drawing of the controller 10. In addition, a cost (i.e., a design cost, an evaluation cost, and a management cost) for publication of software caused by a difference of constant may be reduced.

A second embodiment will be explained with reference to FIGS. 5 and 6. The second embodiment is different from the first embodiment in what is stored in the ROM 14 and the EEPROM 12. Only a difference of the second embodiment from the first embodiment will be explained below.

Figure 5:
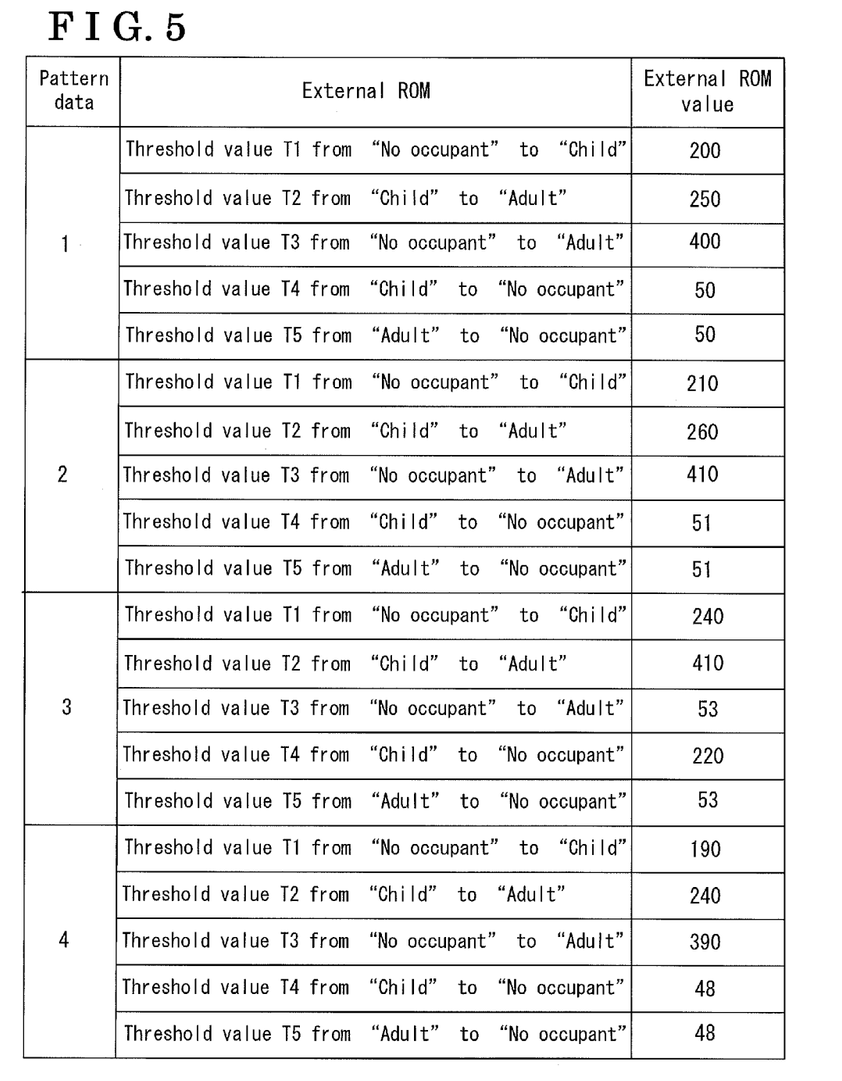
FIG. 5 is a diagram explaining a storage of pattern data in a ROM according to a second embodiment.
Figure 6:
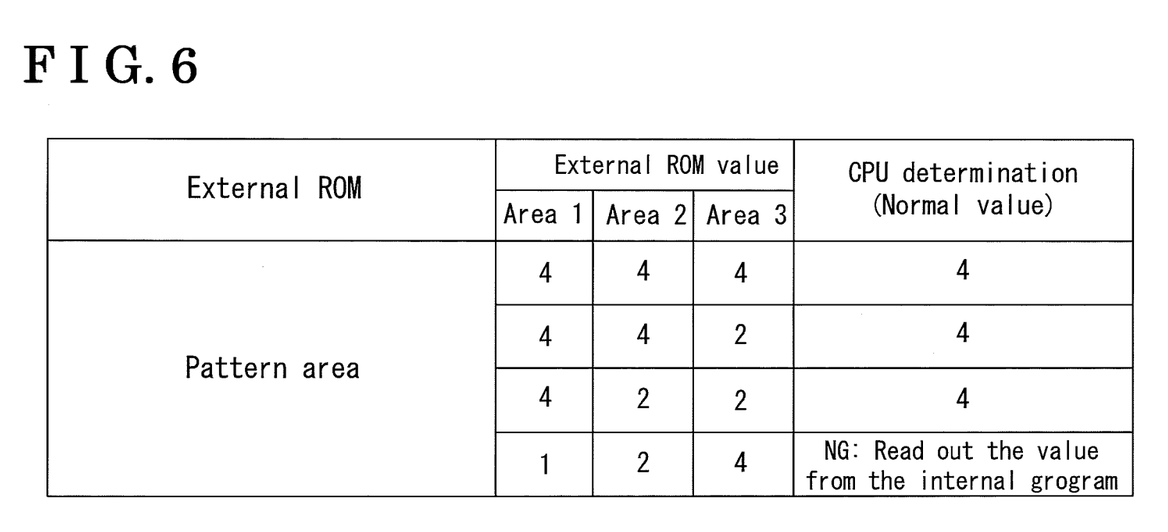
FIG. 6 is a diagram explaining a storage of code information in the EEPROM according to the second embodiment.

As illustrated in FIG. 5, the ROM 14 stores multiple pattern data (specifically, four pattern data) in which the multiple threshold values and the switching of the detection of the occupant (i.e., from "No occupant" to "Child", from "Child" to "Adult", and the like) are correlated to one another. For example, in pattern data 1, the threshold value T1 for switching the occupant detection from "No occupant" to "Child", the threshold value T2 for switching the occupant detection from "Child" to "Adult", the third threshold value T3 for switching the occupant detection from "No occupant" to "Adult", the fourth threshold value T4 for switching the occupant detection from "Child" to "No occupant", and the threshold value T5 for switching the occupant detection from "Adult" to "No occupant" are set to be the values 200, 250, 400, 50, and 50, respectively. Pattern data 2 to 4 are configured in the same manner. The pattern data 1 to 4 are fixed data that are not changeable depending on the vehicle type, and the like.

The EEPROM 12 stores code information (1 to 4) serving as threshold value specific information so as to identify one of the pattern data 1 to 4. The code information is changeable depending on the vehicle type, and the like.

The CPU 13 reads out the program and data related to the occupant detection (including the default value for the threshold value T, i.e., the default values for the threshold values T1 to T5) from the ROM 14 and also reads out the code information from the EEPROM 12 in the initial operation. The CPU 13 then writes the program and data from the ROM 14 and the code information from the EEPROM 12 into the RAM 15 serving as the work space. At this time, the CPU 13 uses the threshold values T1 to T5 constituting one of the pattern data 1 to 4 that conforms to the code information read out from the EEPROM 12. Then, the CPU 13 basically performs the occupant detection based on the threshold value T (specifically, the threshold values T1 to T5) of one of the pattern data 1 to 4 that is read out from the ROM 14 and that conforms to the code information read out from the EEPROM 12. In addition, in a case where it is determined that the code information read out from the EEPROM 12 show an error, the CPU 13 performs the occupant detection based on the default value for the threshold value T read out from the ROM 14.

The storage of the code information in the EEPROM 12 will be explained below. As illustrated in FIG. 6, the EEPROM 12 according to the second embodiment stores the code information in three storage areas (i.e., areas 1 to 3). The CPU 13 reads out the code information in all the areas 1 to 3 in the EEPROM 12 and determines or obtains the normal value for the code information by majority decision. Such determination is performed so as to restrain an occurrence of malfunction in the occupant detection even when the code information stored in the EEPROM 12 shows an error.

For example, in a case where the code information in all the areas 1 to 3 is equal to a value 4, the value 4 is determined to be the normal value. In a case where the code information in the areas 1 and 2 is equal to the value 4 while the code information in the area 3 is equal to a value 2, the value 4 is determined as the normal value. In a case where the code information in the area 1 is equal to the value 4 while the code information in the areas 2 and 3 is equal to the value 2, the value 2 is determined as the normal value. On the other hand, in a case where the code information is different among the areas 1 to 3, i.e., the code information in the areas 1, 2, and 3 is equal to the values 1, 2, and 4, respectively, the majority decision is impossible to determine or obtain the normal value. In this case, the CPU 13 uses the default value for the threshold value T (the threshold values T1 to T5) stored beforehand in the ROM 14.

Figure 7A:
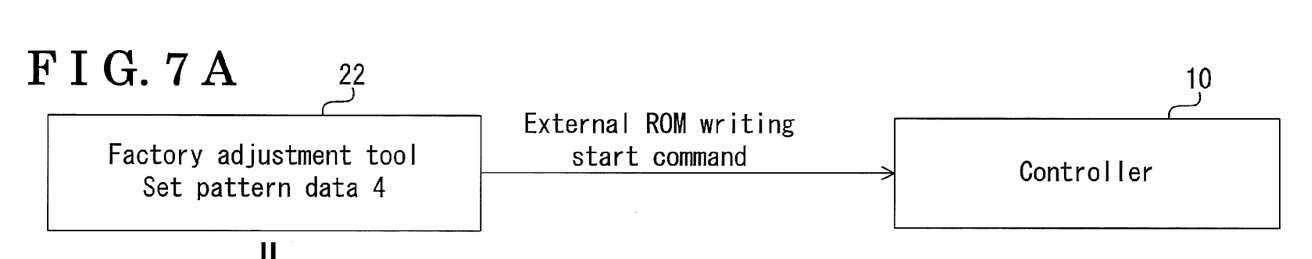
FIGS. 7A, 7B, 7C, and 7D are diagrams each illustrating an example of writing procedures of the code information in the EEPROM according to the second embodiment.
Figure 7B:
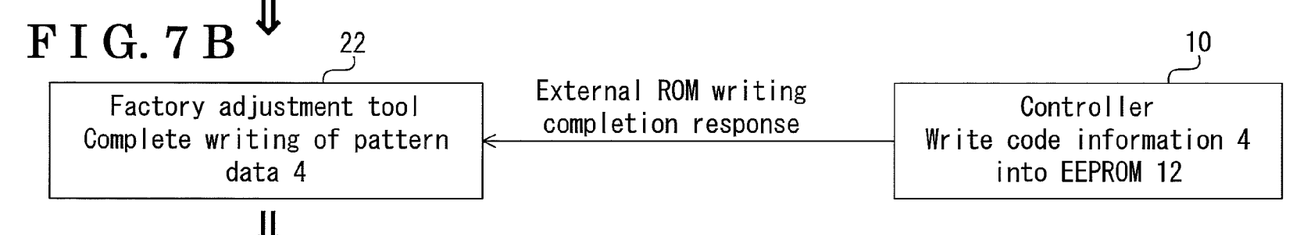

An example of writing procedures of the code information into the EEPROM 12 will be explained with reference to FIGS. 7A, 7B, 7C, and 7D. When the code information is set to be the value 4 in the factory adjustment tool 22, for example, the factory adjustment tool 22 transmits an external ROM writing start command to the controller 10 as illustrated in FIG. 7A. Then, the controller 10 writes the value 4 as the code information into the EEPROM 12 (i.e., the external ROM). At this time, the value 4 is written into all the areas 1 to 3 as the code information. At a time of completion of the writing, the controller 10 sends an external ROM writing completion response to the factory adjustment tool 22 as illustrated in FIG. 7B. Accordingly, the writing of the value 4 as the code information into the EEPROM 12 is completed in the factory adjustment tool 22.

Figure 7C:
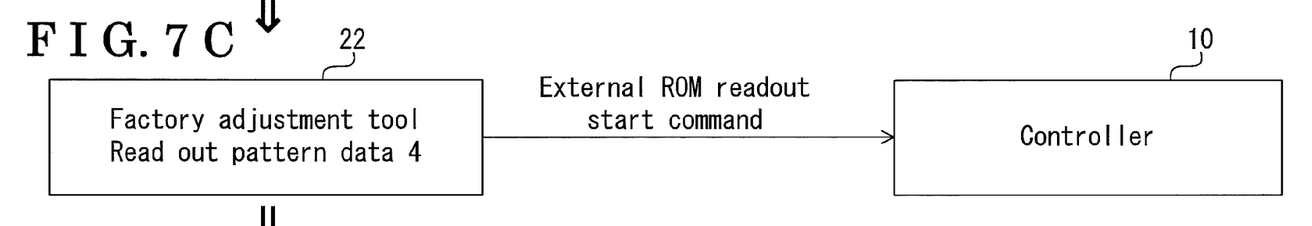
Figure 7D:
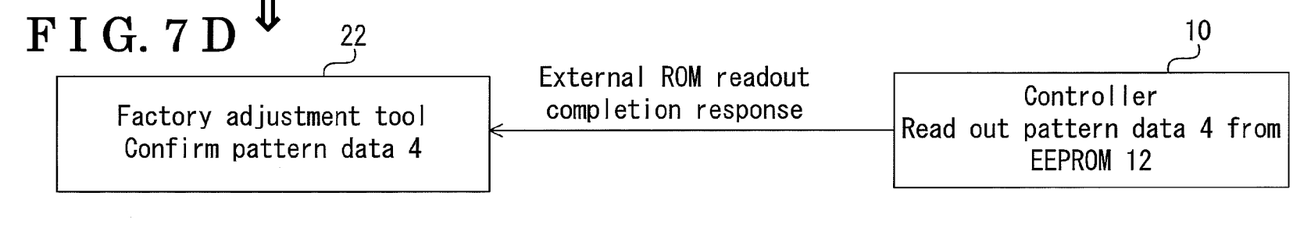

Next, the factory adjustment tool 22 sends an external ROM readout start command to the controller 10 so as to confirm whether the writing is correctly conducted as illustrated in FIG. 7C. Then, the controller 10 reads out the value 4 as the code information from the EEPROM 12. When the readout is completed, the controller 10 sends an external ROM readout completion response to the factory adjustment tool 22 as illustrated in FIG. 7D. As a result, the value 4 as the code information in the EEPROM 12 is confirmed by the factory adjustment tool 22.

In a case where it is confirmed that the code information is correctly written into the EEPROM 12 in the aforementioned manner, the controller 10 is delivered as an adjustment completed item. According to the second embodiment, the following effects are additionally obtained.

According to the occupant detection system of the second embodiment, the code information is read out from the EEPROM 12 while one of the pattern data 1 to 4 that conforms to the code information is read out from the ROM 14. Thus, the occupant detection system determines the occupancy of the seat (for example, "No passenger", "Child", and "Adult") based on the magnitude relationship between the detection load value and the threshold values T1 to T5 constituting the pattern data read out from the ROM 14. That is, the occupant detection system determines the switching of the occupant detection (for example, from "No occupant" to "Child", from "Child" to "Adult", and the like) based on the magnitude relationship between the detection load value and the threshold values T1 to T5 constituting the pattern data read out from the ROM 14. Accordingly, the occupant seated on the seat is further securely detected. In this case, because the EEPROM 12 only stores the code information selected during the factory adjustment, a necessary storage capacity is reduced.

The aforementioned first and second embodiments may be modified as below. In the first embodiment, in a case where the threshold value T has deviation characteristics so that the threshold value T constantly substantially changes or deviates by an identical amount in either an addition side or a subtraction side relative to a predetermined reference threshold value, the EEPROM 12 may only store a correction factor by which the threshold value T is identifiable on a basis of the deviation characteristics thereof. In this case, the multiple types of the EEPROM 12 (the controllers 10) may be represented by an offset. On the other hand, in a case where the threshold value T has the deviation characteristics by which the threshold value T does not change or deviate by the identical amount, the multiple types of the EEPROM 12 (the controllers 10) may be represented by an approximated curve.

According to the first and second embodiments, types of the EEPROM 12 and the ROM 14 may be appropriately selected as long as the rewriting of the ROM 14 is more difficult than the rewriting of the EEPROM 12. In addition, the fixed data is stored in the ROM 14 (the internal ROM) while either one of the threshold value that is changeable depending on the vehicle type and the like, and the threshold value specific information for the identification of the threshold value is stored in the EEPROM 12 (the external ROM). Alternatively, the EEPROM 12 may be installed in the microcontroller 11.

According to the aforementioned first and second embodiments, the controller 10 (the storage unit) for the occupant detection system includes the EEPROM 12 (the first ROM) that stores the correction factor for changing the predetermined reference value by the identical amount in either the addition side or the subtraction side.

According to the aforementioned first and second embodiments, the controller 10 for the occupant detection system detecting the occupant based on the magnitude correlation between the detection load value obtained by the load sensor and the threshold value T, the controller 10 includes the EEPROM 12 storing either one of the threshold value T and the code information for identifying the threshold value T, the EEPROM 12 being rewritable, and the ROM 14 storing information except for either one of the threshold value T and the code information, the rewriting of the ROM 14 being more difficult than the rewriting of the EEPROM 12.

Accordingly, the threshold value T or the code information is rewritable in the EEPROM 12. Therefore, the writing of the threshold value T or the code information to the EEPROM 12 is performed in the factory adjustment. All the controllers 10 for the occupant detection system are the similar types (i.e., having a similar configuration) before the writing of the threshold value T or the code information, thereby reducing a management cost. In addition, the rewriting of information except for the threshold value T or the code information (for example, program) into the ROM 14 is difficult, i.e., the rewriting of the ROM 14 is more difficult than the rewriting of the EEPROM 12. Therefore, the ROM 14 is restrained from being rewritten by mistake at the factory.

According to the aforementioned first and second embodiments, the EEPROM 12 stores the multiple threshold values T1, T2, T3, T4, and T5 for switching the detection of the occupant.

Accordingly, the occupant detection system determines the occupancy of the seat (for example, "No passenger", "Child", and "Adult") based on the magnitude relationship between the detection load value and one of the multiple threshold values, i.e., the threshold values T1 to T5. That is, the occupant detection system determines the switching of the occupant detection (for example, from "No occupant" to "Child", from "Child" to "Adult", and the like) based on the magnitude relationship between the detection load value and one of the threshold values T1 to T5. Accordingly, the further secure occupant detection may be achieved.

According to the aforementioned second embodiment, the ROM 14 stores the multiple pattern data in which the switching of the detection of the occupant is correlated to the multiple threshold values T1 to T5, and the EEPROM 12 stores the code information 1 to 4 to identify one of the multiple pattern data.

Accordingly, the code information is read out from the EEPROM 12 while one of the pattern data 1 to 4 that conforms to the code information is read out from the ROM 14. Then, the occupant detection system determines the occupancy of the seat (for example, "No passenger", "Child", and "Adult") based on the magnitude relationship between the detection load value and the threshold values T1 to T5 constituting the pattern data read out from the ROM 14. That is, the occupant detection system determines the switching of the occupant detection (for example, from "No occupant" to "Child", from "Child" to "Adult", and the like) based on the magnitude relationship between the detection load value and the threshold values T1 to T5 constituting the pattern data read out from the ROM 14. Accordingly, the occupant seated on the seat is further securely detected. In this case, because the EEPROM 12 only stores the code information selected during the factory adjustment, a necessary storage capacity is reduced.

According to the aforementioned first and second embodiments, the EEPROM 12 stores either one of the threshold value T and the code information in each of three or more storage areas (the areas 1 to 3) so as to determine the normal value for either one of the threshold value T and the code information by majority decision.

Accordingly, even when the threshold value T or the code information shows an error in one of the storage areas of the EEPROM 12, the occupant detection system according to the aforementioned first and second embodiments uses the threshold value T or the code information that is obtained by majority decision. Consequently, the occupant detection may be continuously performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A storage unit for an occupant detection system detecting an occupant seated on a vehicle seat based on a magnitude correlation between a detection load value obtained by a load sensor and a threshold value, the storage unit comprising:
   a first ROM storing code information identifying one of a plurality of pattern data, the first ROM being rewritable; and
   a second ROM storing the plurality of pattern data, each of the pattern data correlating different changes in the detection of the occupant seated on the seat to a plurality of the threshold values, a rewriting of the second ROM being more difficult than a rewriting of the first ROM.

2. The storage unit according to claim 1, wherein the pattern data identified by the code information stored in the first ROM is a first pattern data which: correlates different change in the occupant seated on the seat to different threshold values.

3. The storage unit according to claim 1, wherein the first ROM stores the code information in each of three or more storage areas, and when the code information stored in all of the storage areas is not the same but the code information in plural of the storage areas is the same, a CPU determines the code information used to identify the pattern data by a majority decision.

4. The storage unit according to claim 2, wherein the first ROM stores the code information in each of three or more storage areas, and when the code information stored in all of the storage areas is not, the same but the code information in plural of the storage areas is the same, a CPU determines the code information used to identify the pattern data by a majority decision.

5. The storage unit according to claim 3, wherein when the code information stored in all of the storage areas is different, the CPU uses a default value for the threshold value which is stored in the second ROM.

6. The storage unit according to claim 1, wherein the first ROM is an EEPROM and the second ROM is random access memory included in a microcontroller.

7. The storage unit according to claim 1, wherein the pattern data identified by the code information stored in the first ROM is a first pattern data which: correlates a change in the occupant seated on the seat from no occupant to a child to a first threshold value; correlates a change in the occupant seated on the seat from the child to an adult to a second threshold value; correlates a change in the occupant seated on the seat from no occupant to the adult to a third threshold value; and correlates a change in the occupant seated on the seat from child to no occupant to a fourth threshold value.

8. The storage unit according to claim 7, wherein the first threshold value, the second threshold value, the third threshold value and the fourth threshold value are all different from one another.

9. The storage unit according to claim 1, wherein each of the plurality of pattern data stored in the second ROM: correlates a change in the occupant seated on the seat from no occupant to a child to a first threshold value; correlates a change in the occupant seated on the seat from the child to an adult to a second threshold value; correlates a change in the occupant seated on the seat from no occupant to the adult to a third threshold value; and correlates a change in the occupant seated on the seat from the child to no occupant to a fourth threshold value.

10. The storage unit according to claim 9, wherein the first threshold value of one pattern data differs from the first threshold value of an other pattern data.

11. The storage unit according to claim 10, wherein the second threshold value of the one pattern data differs from the second threshold value of the other pattern data.

12. The storage unit according to claim 9, wherein the second threshold value of one pattern data differs from the second threshold value of an other pattern data.

13. A storage unit for an occupant detection system detecting an occupant seated on a vehicle seat based on a magnitude correlation between a detection load value obtained by a load sensor and a threshold value, the storage unit comprising:
a first ROM storing code information identifying one of a plurality of pattern data, the first ROM being rewritable;
a second ROM configured so that rewriting of the second ROM is more difficult than rewriting of the first ROM;
the second ROM storing the plurality of pattern data, each of the pattern date correlating different changes in the occupant seated on the vehicle seat to different ones of the threshold values; and
the different changes in the occupant seated on the vehicle seat including a change from no occupant seated in the vehicle seat to a child seated on the vehicle seat, and a change from no occupant seated in the vehicle seat to an adult seated on the vehicle seat.

14. The storage unit according to claim 13, wherein the first ROM stores the code information in each of three or more storage areas, and when the code information stored in at least two of the storage areas is different but the code information in plural of the storage areas is the same, a CPU determines the code information used to identify the pattern data by the majority of the code information stored in the storage areas.

15. A storage unit for an occupant detection system detecting an occupant seated on a vehicle seat based on a magnitude correlation between a detection load value obtained by a load sensor and a threshold value, the storage unit comprising:
a first ROM storing a plurality of threshold values each correlated to a different change in the occupant seated on the vehicle seat, the first ROM being rewritable and the threshold values stored in the first ROM being read out by a CPU;
a second ROM storing information, but not storing the threshold values, the information stored in the second ROM including a default value selected as the threshold value whenever the threshold value read out by the CPU is determined to be an error value; and
a rewriting of the second ROM being more difficult than a rewriting of the first ROM.

16. The storage unit according to claim 15, wherein the first ROM is an EEPROM and the second ROM is random access memory included in a microcontroller.

17. The storage unit according to claim 15, wherein the different changes in the occupant seated on the vehicle seat include: a change in the occupant seated on the seat from no occupant to a child; a change in the occupant seated on the seat from the child to an adutt; a change in the occupant seated on the seat from no occupant to the adult; and a change in the occupant seated on the seat from the child to no occupant.

* * * * *